(12) United States Patent
Burns et al.

(10) Patent No.: US 7,818,790 B1
(45) Date of Patent: Oct. 19, 2010

(54) ROUTER FOR USE IN A MONITORED NETWORK

(75) Inventors: John Arley Burns, Houston, TX (US); Edward J. Blevins, Austin, TX (US); John Adrian Burns, Bastrop, TX (US); Charles C. Hardin, Minneapolis, MN (US); Samuel D. Hartman, Cambridge, MA (US); Dale S. Walker, Houston, TX (US); Ricky C. White, Salado, TX (US)

(73) Assignee: ERF Wireless, Inc., Houston, TX (US)

( * ) Notice: Subject to any disclaimer, the term of this patent is extended or adjusted under 35 U.S.C. 154(b) by 1024 days.

(21) Appl. No.: 11/533,652

(22) Filed: Sep. 20, 2006

Related U.S. Application Data (60) Provisional application No. 60/783,488, filed on Mar. 17, 2006.

(51) Int. Cl.
*G06F 21/22* (2006.01)
*G06F 9/00* (2006.01)

(52) U.S. Cl. ............... 726/7; 726/1; 726/14; 713/193

(58) Field of Classification Search ............... None
See application file for complete search history.

(56) References Cited

U.S. PATENT DOCUMENTS

| | | | | |
|---|---|---|---|---|
| 5,941,972 | A * | 8/1999 | Hoese et al. ............... 710/315 |
| 6,421,753 | B1 * | 7/2002 | Hoese et al. ............... 710/315 |
| 6,425,035 | B2 * | 7/2002 | Hoese et al. ............... 710/315 |
| 6,438,612 | B1 * | 8/2002 | Ylonen et al. ............... 709/249 |
| 6,938,089 | B1 * | 8/2005 | Slaby et al. ............... 709/229 |
| 7,010,639 | B2 * | 3/2006 | Larson et al. ............... 710/311 |
| 7,096,256 | B1 * | 8/2006 | Shafer ............... 709/220 |
| 7,134,138 | B2 * | 11/2006 | Scherr ............... 726/2 |
| 7,167,929 | B2 * | 1/2007 | Steinmetz et al. ............... 710/5 |
| 7,269,639 | B1 * | 9/2007 | Lawrence ............... 709/220 |
| 7,328,349 | B2 * | 2/2008 | Milliken ............... 713/181 |
| 7,366,902 | B2 * | 4/2008 | Bakke ............... 713/168 |
| 7,370,349 | B2 * | 5/2008 | Holvey et al. ............... 726/5 |
| 7,421,485 | B2 * | 9/2008 | Shafer ............... 709/220 |
| 7,496,950 | B2 * | 2/2009 | Carley ............... 726/3 |
| 7,519,986 | B2 * | 4/2009 | Singhal ............... 726/2 |
| 7,552,478 | B2 * | 6/2009 | Seki et al. ............... 726/23 |
| 7,562,384 | B1 * | 7/2009 | Huang ............... 726/5 |
| 7,567,522 | B2 * | 7/2009 | Borowski ............... 370/254 |
| 7,596,614 | B2 * | 9/2009 | Saunderson et al. ............... 709/224 |
| 7,624,452 | B2 * | 11/2009 | Young et al. ............... 726/30 |
| 7,631,109 | B2 * | 12/2009 | Roellgen ............... 710/8 |
| 7,634,802 | B2 * | 12/2009 | Chiloyan ............... 726/4 |
| 2009/0016357 | A1 * | 1/2009 | Blevins et al. ............... 370/395.53 |

* cited by examiner

*Primary Examiner*—Christopher A Revak
(74) *Attorney, Agent, or Firm*—Conley Rose, P.C.

(57) ABSTRACT

A network of routers is monitored by a monitoring server. Each router implements various security mechanisms to secure the operation of the routers. For example, each router comprises control logic that implements a security protocol dictated, at least in part, by contents of at least two separate external storage devices, each storage device separate from, but coupled to, one of the ports of said router.

30 Claims, 5 Drawing Sheets

ROUTER FOR USE IN A MONITORED NETWORK

RELATED APPLICATIONS

This application claims priority to U.S. Provisional Patent Application Ser. No. 60/783,488, filed Mar. 17, 2006, entitled "A Method And Apparatus For A Secure, Triple-Controlled Network With Dual-Control Routers Via Detachable Encryption Keys," which is incorporated by reference in its entirety.

This application contains subject matter that may be related to U.S. Nonprovisional application Ser. No. 11/533,672, filed Sep. 20, 2006, and entitled "Monitoring Server For Monitoring A Network Of Routers."

BACKGROUND

Routers are electrical devices that are used to permit computers and networks of computers to pass information back and forth. A router typically has one or more input ports and one or more output ports. Data packets containing a destination address arrive on an input port. Based on the destination address, the router forwards the data packet to an appropriate output port which may be connected to the destination node or to another router.

The information being transmitted between routers may be confidential (e.g., bank account information in the context of a bank's network) and thus the security of such information should be ensured. Accordingly, at least some routers provide encryption to allow secure communications across an untrusted communication channel, such as the Internet.

Unfortunately, such routers only ensure security of information transmitted between the routers. The security of the routers themselves often is not ensured. For example, a network engineer responsible for the router may be given full control of the router for purposes of maintaining and configuring the router, thereby creating a single point of control problem.

SUMMARY

The aforementioned issues are addressed, at least in part, by a network of routers monitored by a monitoring server. Each router comprises implements various security mechanisms to address one or more of the issues noted above.

In accordance with at least one embodiment, each router comprises a plurality of ports and control logic coupled to the plurality of ports. The control logic implements a security protocol dictated, at least in part, by contents of at least two separate external storage devices, each storage device separate from the router, but coupled to one of the ports of said router.

In accordance with another embodiment, a router comprises a plurality of ports and control logic. The control logic coupled to the plurality of ports. The control logic precludes a configuration of said router to be changed without authenticating at least two persons via biometrics.

In accordance with another embodiment, a system comprises a monitoring system and a plurality of routers coupled to, and monitored by, the monitoring system. Each of the routers implements a security protocol dictated, at least in part, by contents of a plurality of external storage devices separate from, but coupled to, ports of said router.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Overview

Embodiments of the invention preclude, or at least reduce the risk of, various types of internal attacks while also alerting responsible parties of some or all potentially unauthorized operations. Internal attacks refer to the security of the routers being compromised by otherwise trusted personnel of the organization that owns and/or operates the routers, for example, a network administrator. At least some embodiments of the invention provide a router-based system with multiple (e.g., three) levels of control that are implemented with respect to the routers. As disclosed, no one person can single-handedly change the configuration of a router. Changing the configuration requires at least two people (i.e., two levels of control). A monitoring center, generally separate from the location of the routers, provides a third level of control by monitoring the activity of the routers. The teachings of this disclosure has applicability to financial institutions and networks, information networks, and other types of institutions and/or networks.

Figure 1:
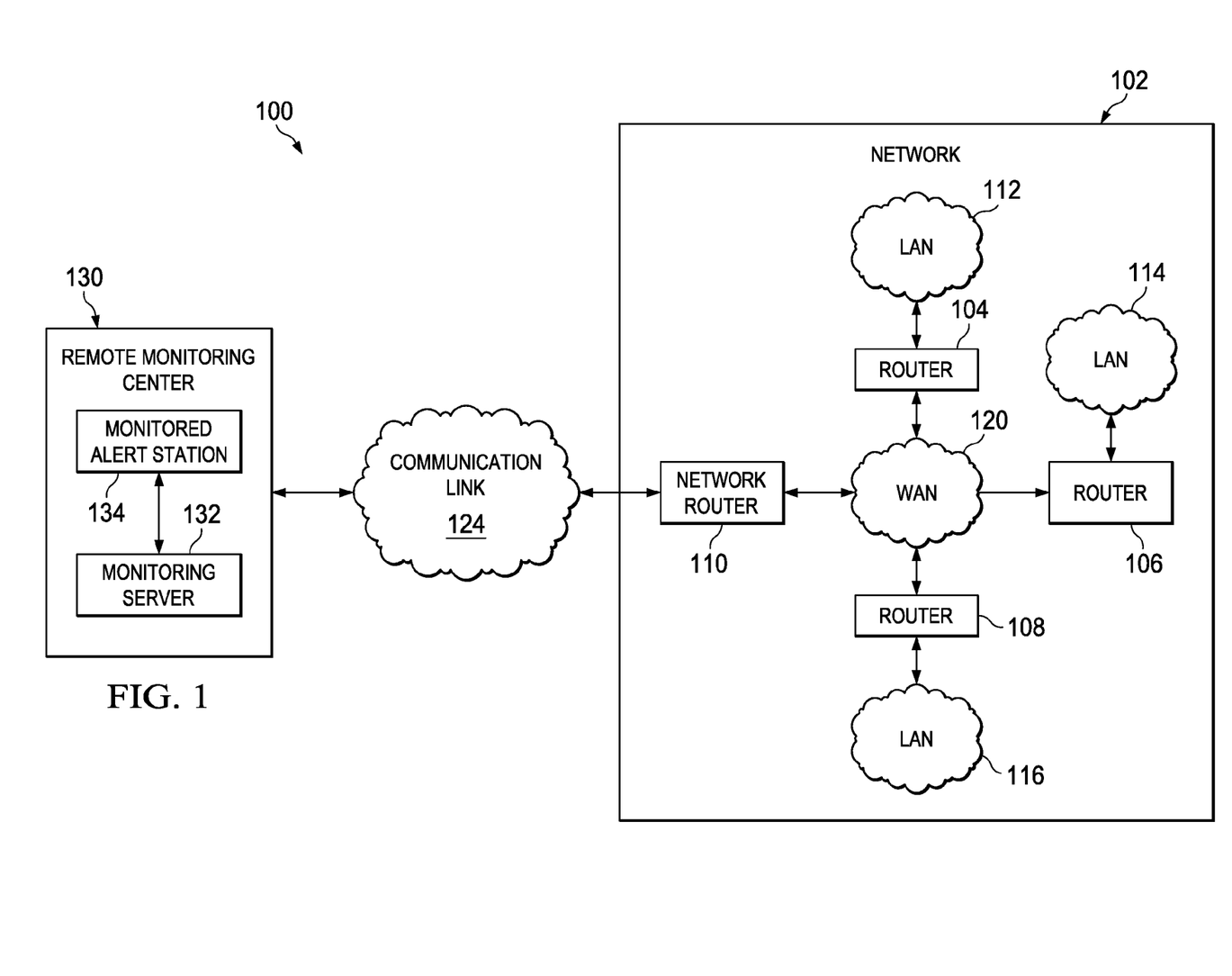
FIG. 1 shows a system in accordance with various embodiments of the invention comprising a network of routers in communication with a monitoring center.

FIG. 1 shows an embodiment of a system 100 in which a network 102 of routers couples to a remote monitoring center 130 by way of a communication link 124. The communication link 124 may comprise any suitable form of communication such as the Internet. As the name implies, the remote monitoring center 130 is generally located remote from network 102, but such need not be the case. For example, some or all of the network 102 could be co-located with the remote monitoring center 130.

As shown in FIG. 1, the network 102 comprises one or more routers 104, 106, 108, and 110. Each of routers 104, 106, and 108 are shown coupled to local area networks (LANs) 112, 114, and 116, respectively. Each LAN 112, 114, and 116 comprises one or more computing devices (e.g., servers, desktop computers, etc.). Computing devices within a LAN transmit packets to, and receive packets from, other LANs by way of the routers. For example, a computing device within LAN 112 can transmit a packet to a computing device within LAN 114 by way of routers 104 and 106. Alternatively, the packet from LAN 112 may be routed to LAN 114 by way of network router 110. In at least some embodiments, the packet contains routing information that is used to route the packets to the intended target computing device within LAN 114. Router 104 receives the packet, examines the routing information and determines to which other router to send the packet. In this example, router 104 determines that the packet should be transmitted to router 106. The packet is transmitted from router 104 to router 106 via private wide area network (WAN) 120. In some embodiments, additional routers within or coupled to the LANs and WAN can be included as well to provide, for example, lower-level network connectivity. In at least some embodiments of the invention, the communication between routers 104-110 (and WAN 120) comprises wireless transmissions, but such is not a limitation on this disclosure. To the extent wireless communication is implemented in network 102, the routers themselves preferably do not provide such wireless capability. Instead, separate wireless transmission equipment (not specifically shown) couples to the routers and provides such capability.

In some embodiments, WAN 120 could be an "untrusted" network a network in which data security cannot be guaranteed or monitored). In such cases, data is encrypted to protect such data as it passes through the untrusted WAN 120.

In the preceding example, router 106 receives the packet that originated from LAN 112 targeting a computing device in LAN 114. Router 106 examines the destination address in the packet and determines that the target device comprises a computing device within that router's own LAN 114. Router 106 accordingly forwards the packet to the appropriate computing device in LAN 114.

A receiving router attached to the network will process a packet from a source router provided the source router is pre-authorized to communicate with the receiving router. That is, each router preferably is configured to send packets to, and receive packets from, only certain designated other routers.

A pair of routers is configured to exchange packets via a "tunnel." In accordance with preferred embodiments of the invention, such packets are encrypted using a secret encryption key. The secret key for each tunnel associated with each router on the network is stored on a configuration device coupled to the router. When a packet is received by a router, the router decrypts the packet with the secret key specific to that packet's source. If decryption fails, the router drops the packet meaning that further processing of the packet is not conducted. In at least some embodiments, elaborate firewall rules are not implemented; only packets from known, cryptographically verified routers are ever processed on the network. Unencrypted packets, besides low-level routing protocols, are never sent over the network.

As shown in FIG. 1, router 110 is referred to as the "network" router. Through network router 110, the remaining routers 104-108 and various LANs 112-116 in network 102 communicate with the remote monitoring center and, specifically to the monitoring server 132. Network 102 may include a firewall as desired. In at least some embodiments, a firewall comprises a barrier in a network that will only pass packets that are authorized to reach the other side of the barrier.

The monitoring center 130 comprises one or more servers 132 and alert workstations 134. A firewall also may be included as well in the monitoring center 130. The operation of the monitoring center 130 will be described below.

Figure 2:
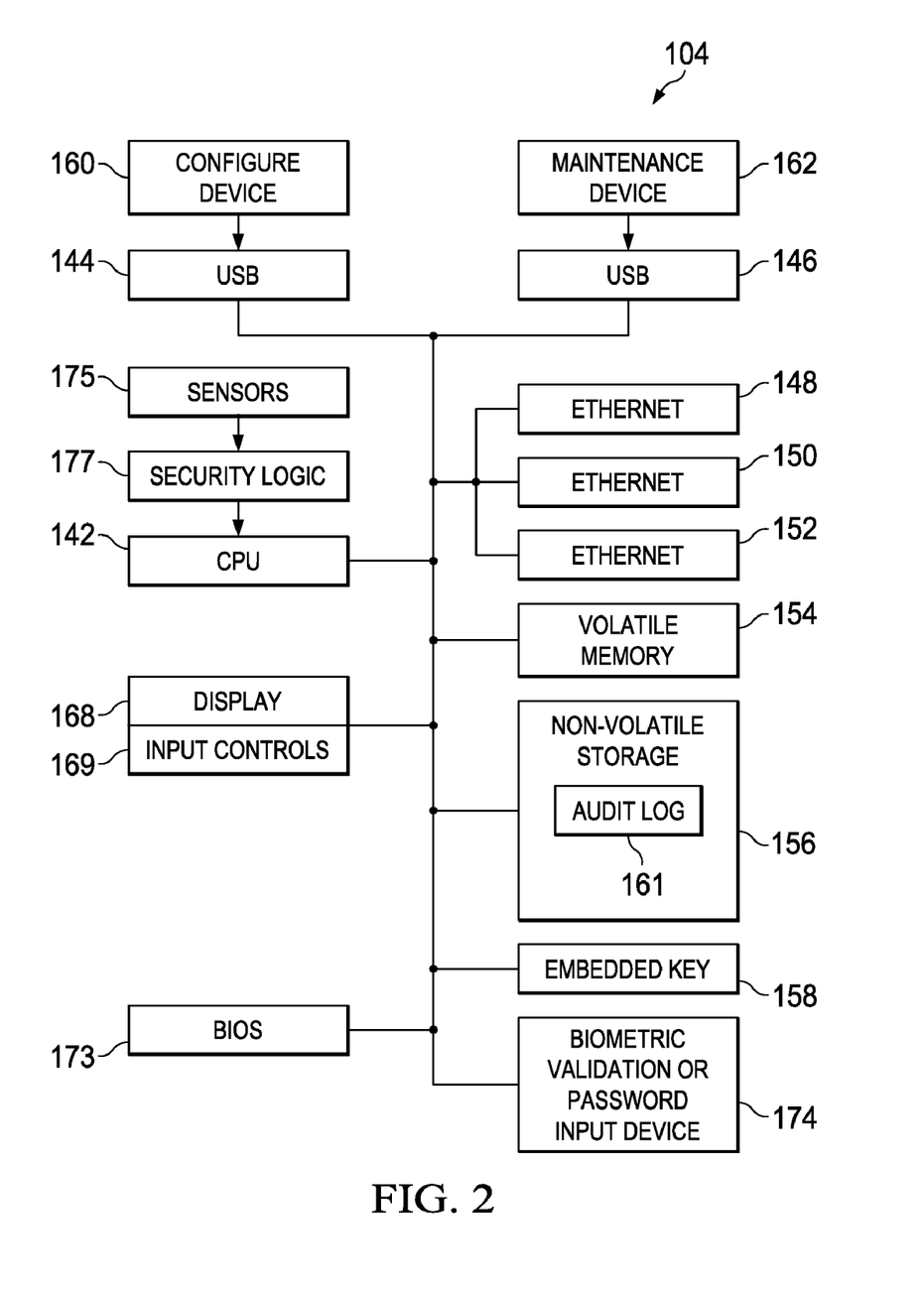
FIG. 2 shows an illustrative embodiment of the routers of FIG. 1.

FIG. 2 shows a preferred embodiment of router 104, although other routers may be constructed identically or at least similarly. As will be seen below, the router comprises control logic that implements a security protocol dictated, at least in part, the contents of two separate external storage devices, thereby providing enhanced security than might otherwise be the case. Among other components, router 104 preferably comprises a central processing unit (CPU) 142 (which, at least in part, comprises the control logic), multiple ports 144, 146, multiple Ethernet ports 148, 150, 152, volatile memory such as random access memory (RAM) 154, non-volatile storage 156, a status display 168, and input controls 169. The ports 144, 146 may be Universal Serial Bus (USB) ports or any other pluggable interface capable of supporting any form of external memory. The non-volatile storage may comprise a hard drive, Flash memory, etc. The display 168 preferably comprises a liquid crystal display (LCD). The input controls 169 may be cursor (e.g., arrow keys) controls to navigate menus shown on display 168, a power on/off control, and a reboot control. In some embodiments, the cursor, power on/off and reboot controls constitute all of the controls accessible to a user of the router, while in other embodiments, different or additional controls may be provided. A basic input/output system (BIOS) 173 is also provided which provides low level control of the router. BIOS 173 preferably is stored in a suitable non-volatile storage such storage 156 or a separate read only memory (ROM).

At least one of the Ethernet ports 148-152 is used to couple to the router's LAN 114 as illustrated in FIG. 1. Another one of the Ethernet ports 148-152 preferably is used to couple to the network's WAN 120. A third of the Ethernet ports can be coupled to other networks and devices as desired. Packets received over the Ethernet port coupled to the router's LAN (e.g., LAN 112 for router 104) are examined by the CPU 142 and forwarded through the Ethernet port coupled to the WAN 120 for subsequent transmission to the target computing device. The non-volatile storage 156 contains code 161 that is executed on CPU 142 and that gives router 104 some or all of the functionality described herein. The non-volatile storage 156 also is used to store an audit log 163, whose function will be explained below. Volatile memory 154 comprises temporary scratchpad memory for use by, for example, the CPU 142.

Referring still to FIG. 2, router 104 also comprises an embedded key 158. Embedded key 158 comprises an unmodifiable, globally unique embedded key that is stored (e.g., in non-volatile storage 156) on the router preferably during manufacture of the router. The globally-unique nature of the embedded key means that each router has an embedded key that differs from the embedded keys of other routers. The embedded key 158 is used to encrypt information that is stored on a configuration device 160 and a maintenance device 162 as will be explained below.

The configuration device 160 preferably comprises a USB compatible portable device that can be mated to, and removed from, USB port 144. The configuration device 160 contains route information and secret keys usable in connection with the route information. Each pair of routers in the network configured to exchange packets with each other uses a common, shared secret key to encrypt and decrypt such packets. For example, routers 104 and 106 may be configured to trade packets and such routers use the same secret key, Router 104 uses the shared secret key to encrypt a packet destined for router 106. Router 106 uses the same shared secret key to decrypt the received packet. Packets from router 106 destined for router 104 are encrypted by router 106 and decrypted by router 104 preferably using the same secret key mentioned above with regard to packets in the opposite direction, although a different key could be used in some embodiments.

Public key encryption is implemented in each router as explained below, although any other suitable form encryption can alternatively be used. Each router includes its own private key, stored on that router's configuration device 160. The private key for each router is not shared with other routers. Corresponding to each private key is a "public" key. The public key of a particular router is shared with all other routers in the network and is stored on the configuration devices of all other routers. Public key/private key encryption preferably is employed between each pair of routers to establish a secure link for purposes of negotiating a shared secret session key. The negotiated session key thus functions as an encryption key to be used for symmetric encryption/decryption between that pair of routers. The session key (also referred to as a "secret key") preferably is stored only in a router's volatile memory 154 and thus persists only as long as the router is operational and/or powered on. To enhance security, session keys preferably are not stored in non-volatile storage.

Figure 3A:
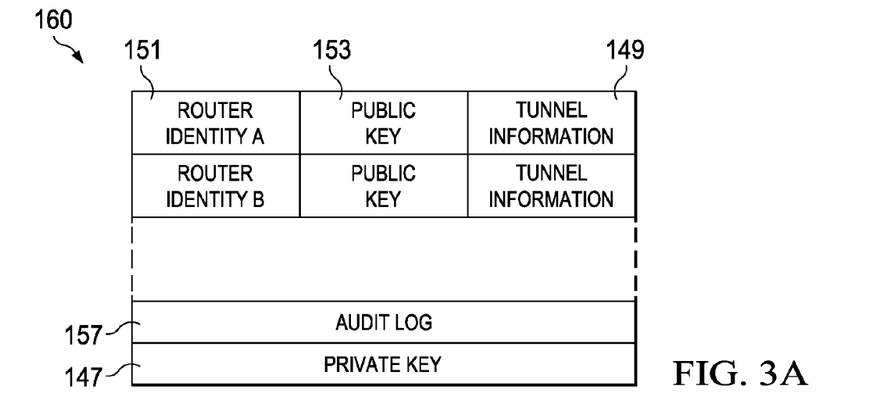
FIG. 3 shows the contents stored on a configuration device usable in conjunction with the routers of FIG. 1.

FIG. 3*a* shows an exemplary embodiment of the information contained on a configuration device 160. The information preferably comprises router identities 151, corresponding public keys 153 and tunnel information 149. Each router identity 151 identifies a router to which the given configuration device's router can trade packets. Each router identity may comprise an Internet Protocol (IP) address, an alphanumeric name, etc. The corresponding public key 153 for that router preferably is used to during a negotiation process with another router to generate an agreed upon session (secret key). Each session key is unique to a pair of routers. Because each router may send and receive encrypted packets from multiple other routers, multiple sets of router identities 151, public keys 153 and tunnel information 149 is stored in each router. The session key comprises a value usable to encrypt and decrypt packets of information between the pair of routers that negotiated for that particular session key. The session key for a given pair of routers can be negotiated during initialization of the routers (or the later router to initialize) and may be renegotiated periodically or upon manual activation. FIG. 3*a* also shows that configuration device 160 for a given router stores that router's private key 147 that is used, as described above, to generate the session key.

Further, the information contained on the configuration device 160 preferably also comprises a copy of an audit log 157. Audit log 157 identifies various events pertaining to the router associated with the configuration device 160. The use of audit log 157 will be described below in further detail.

Figure 3B:
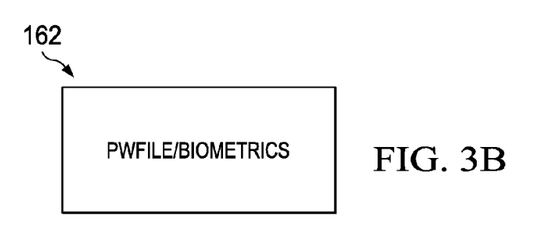

FIG. 3*b* shows the contents of the maintenance device 162. Referring to FIG. 3, the maintenance device 162 preferably contains a password file and biometric authentication information. The password file is hashed and stored as such on the maintenance device 162. The password file 158 contains one or more passwords that users can use to log-on to the router to perform maintenance activities. The maintenance device must be present on the router for the router's configuration to be altered. This process also is explained below. In one embodiment, the information contained on the configuration and maintenance devices 160, 162 is stored on two physically separate devices as illustrated in FIG. 2. In other embodiments, all such information is stored on one device.

The contents of the configuration and maintenance devices 160, 162 associated with (i.e., coupled to) one router preferably differ from the contents of such devices 160, 162 associated with (coupled to) other routers.

In accordance with preferred embodiments of the invention, the users of either or both of the configuration and maintenance devices 160, 162 are authenticated before the devices can be used with the corresponding router (e.g., to perform a maintenance action such as changing the router's configuration). For example, upon coupling a device 160, 162 to the router, the authentication process is performed. The authentication process verifies the person that physically presented the device 160, 162 to the router. Authentication can be in accordance with any suitable technique and is performed using biometric validation or password input device 174. By way, of example, each configuration device 160, 162 may include a biometric sensor (e.g., fingerprint, retinal scan, etc.) to authenticate the user of the corresponding device. In at least one embodiment, a fingerprint template of each user that is permitted to use a configuration or maintenance device is stored on the router's non-volatile storage 156 or biometric validation or password input device 174 prior to using the router in the network. The router's CPU 142 or biometric validation or password input device 174 compares its stored template(s) to a fingerprint pattern obtained from a fingerprint scanner associated with the configuration or maintenance device when such device is coupled to the router. A failure of the biometric mechanism to correctly authenticate the user may cause the router to enter a "lockdown" mode in which the router is rendered inoperative. In at least some embodiments, the lockdown mode comprises transitioning the router to a state in which the router is incapable of processing incoming packets, or disabling power to the router altogether. Additionally or alternatively, a user of a configuration or maintenance device 160, 162 may be verified through entry on input controls 169 of a correct password. Consequently, a password file is stored on the maintenance device 162 (FIG. 3*b*) and the maintenance device must be present, in at least some embodiments, to enable the user to complete the log-on process.

Further, in at least some embodiments each of the configuration and maintenance devices is used by different people. That is, in such embodiments the user of the configuration device 160 is different from the user of the maintenance device 162 for a given router. Forcing the maintenance device user to be a different person than the configuration device user helps to ensure security in that, even if one such user is a malfeasor, such a user alone cannot compromise the security of the router and the data on the network in general. Although a router that accepts two external devices 160, 162 is disclosed, in other embodiments, a different number of external storage devices can be used. Each such device is associated with a person who may have a role in the operation, maintenance and/or configuration of the router. Each such device would contain the configuration and/pr access permissions unique to that person's role in the operation of the router and any mix of these devices could be required to perform certain operations.

Referring still to FIG. 2, router 104 also includes one or more sensors 175 coupled to security logic 177. In at least one embodiment, the sensors are attached to the inside of the router's enclosure (not shown) and comprise, for example, magnetic switches that open (or close) when the router's enclosure is opened, which would indicate a physical security breach of the router itself. Security logic 177 responds to signals from the sensors 175 and interrupts the CPU 142 upon the detection of such a breach.

Figure 4:
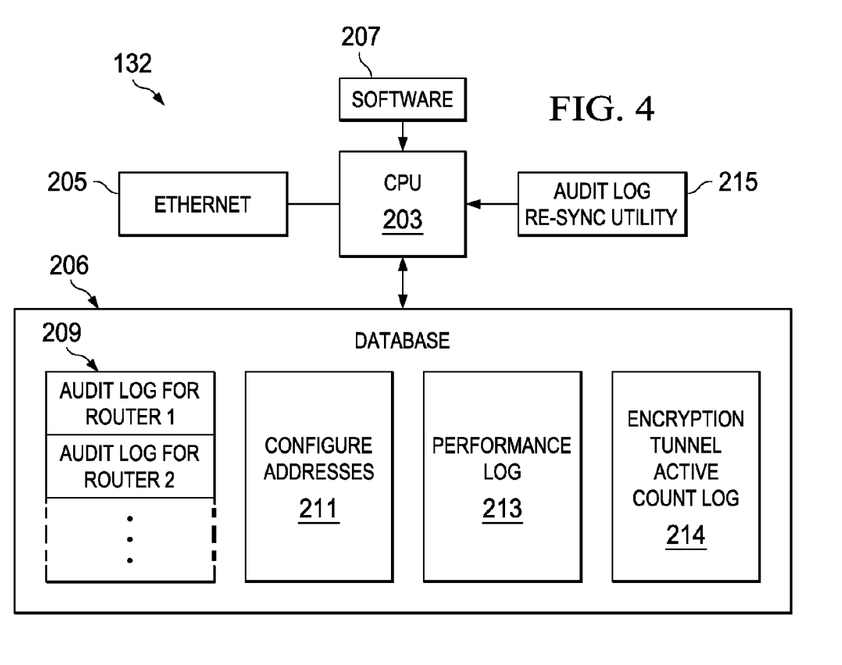
FIG. 4 shows an illustrative embodiment of a monitoring server shown in FIG. 1.

FIG. 4 shows a preferred embodiment of monitoring server 132. The monitoring server comprises a CPU 203, software 207, at least one Ethernet port 205, and audit log re-sync utility 215. The software 207, utility 215, and a database 206 are stored on a storage medium that comprises volatile memory (e.g., RAM), non-volatile storage (e.g., a hard drive), and combinations thereof. Much, or all, of the functions performed by the monitoring server 132 described herein is performed by the CPU 200 upon execution of software 207 in conjunction with database 206.

The database 206 also comprises the audit logs 209 (discussed below) of the routers in the network being monitored by the monitoring server. The database 206 further comprises the configuration addresses 211 that comprise the IP address, network ID, location ID and router type ID of each router on every monitored network. Database 206 also includes a performance log 213 that provides information about the performance of the network 102 and the individual routers contained therein. Database 206 further includes an encryption tunnel active count log. The encryption tunnel active count log 214 logs the number of active encrypted tunnels between any given router and other routers on the network with which the given router has established communication. This log preferably is updated every time a new tunnel is established with a router (such as on router boot-up) and every time an existing tunnel changes state (e.g., by becoming inactive or disconnected). The audit log re-synchronization utility is used to reset the audit logs, as described below, in the event of a router failure or for some other reason that the tripartite audit logs become unsynchronized.

The system described above enables various security mechanisms to prevent, or at least reduce the risk of, various types of internal attacks and detect such attempted attacks.

In accordance with one embodiment of the invention, an audit log is maintained of events of interest including, for example, events that could indicate misdeeds. The occurrence of any type of event can be stored in the audit log. Exemplary events include a router booting up or otherwise being initialized, a router being powered down or otherwise transitioned to an alternate mode of operation from its current mode of operation, changing the routing information for a router, disabling a router's encryption mechanism, and authentication activity (i.e., attempts at authenticating the user of a configuration or maintenance device 160, 162).

In accordance with preferred embodiments of the invention, the system implements a distributed audit log associated with each router. The distributed audit log of a given router is maintained, for example, in three locations, each under control of a different person, for example, audit log 157 of the configuration device 160 for that router, the audit logic 161 of the router's non-volatile storage 156, and the audit log 209 on the monitoring server 132, in at least some embodiments, all three instances of a given router's distributed audit log are identical, or at least should be, unless an improper event has occurred (e.g., an improper attempt to reconfigure the router). With the audit log for a router stored in three places, no single party, or even two parties in collusion, can hide their actions from an audit. All three audit logs should match, and thus mismatched audit logs indicate a problem (e.g., an internal attack). Any attempt to hide a misdeed by altering one of the copies of the tripartite audit log will be detected because at least one other copy of the audit log will not match the inappropriately altered log. A distributed audit log discourages misbehavior. By logging detailed and timely information on transactions, a path is left for auditors to find the parties responsible for any malfeasance. One or more restore software utilities (e.g., audit log re-sync utility 215 executed by the monitoring server 132) are also provided that allow for the reset of the various audit logs upon, for example, a hardware/network failure. However, such software utilities preferably are only operable to reset the audit logs upon co-operation of all three parties (the authorized user of the configuration device 160, the authorized user of the maintenance device 162, and the authorized user of the monitoring server 132). That is, all three parties have to agree to permit the audit logs to be re-synchronized to a common state.

While in some embodiments, all three instances of the audit log are identical, in other embodiments, all three audit logs need not be identical. For example, it may not be necessary for performance data (discussed below) stored in the logs to match exactly, while it may be desirable for other types of information (e.g., logon/logoff events, external device 160/162 insertion and removal, changes in the router's configuration, etc.) to match exactly when monitoring the network for security issues. If an exact match of the entire audit logs is not required, the checksums would be computed for whatever portion of the audit logs is determined to require matching.

Each copy of the audit log preferably is stored in a non-erasable, append only, partition of storage, so that over time the log can be added to, but not taken away from. In addition, the audit logs themselves preferably are only stored in an encrypted format, denying unauthorized users access to the audit log.

To ensure that the control mechanisms are not being bypassed, consistency checking is performed upon the occurrence of various events to ensure that audit logs have not been improperly altered. For example, when a router first initializes (boots up), the router's CPU 142 calculates a checksum of its own internal audit log 161 (FIG. 2) and compares that checksum to a checksum the router calculates of audit log 157 stored on the configuration device 160 that permits the router to function correctly. The checksum of the configuration device's audit log 157 preferably is calculated by the routers CPU 142. If these checksums differ (indicating a possible security breach), an alert is sent to the monitoring server 132 and the router enters the lockdown mode in which the router is rendered inoperative as explained above. If the checksums match, the router configures its routing capability (e.g., loads a routing table) and enters a normal boot mode as described below. The router's checksum of its own log 161 is then transmitted to the monitoring server 132. The monitoring server 132 compares the checksum received from the router with a checksum the monitoring server calculates of its own copy of the audit log 209 for that particular router. If the checksums differ, the monitoring server provides an alert to the monitored alert station 134 that the router has been altered and, in some embodiments, causes the router to transition to a lockdown mode. If the checksums match, then the router is permitted by the monitoring server to continue operating in a normal mode. Other mechanisms besides checksums are possible as well.

Figure 5:
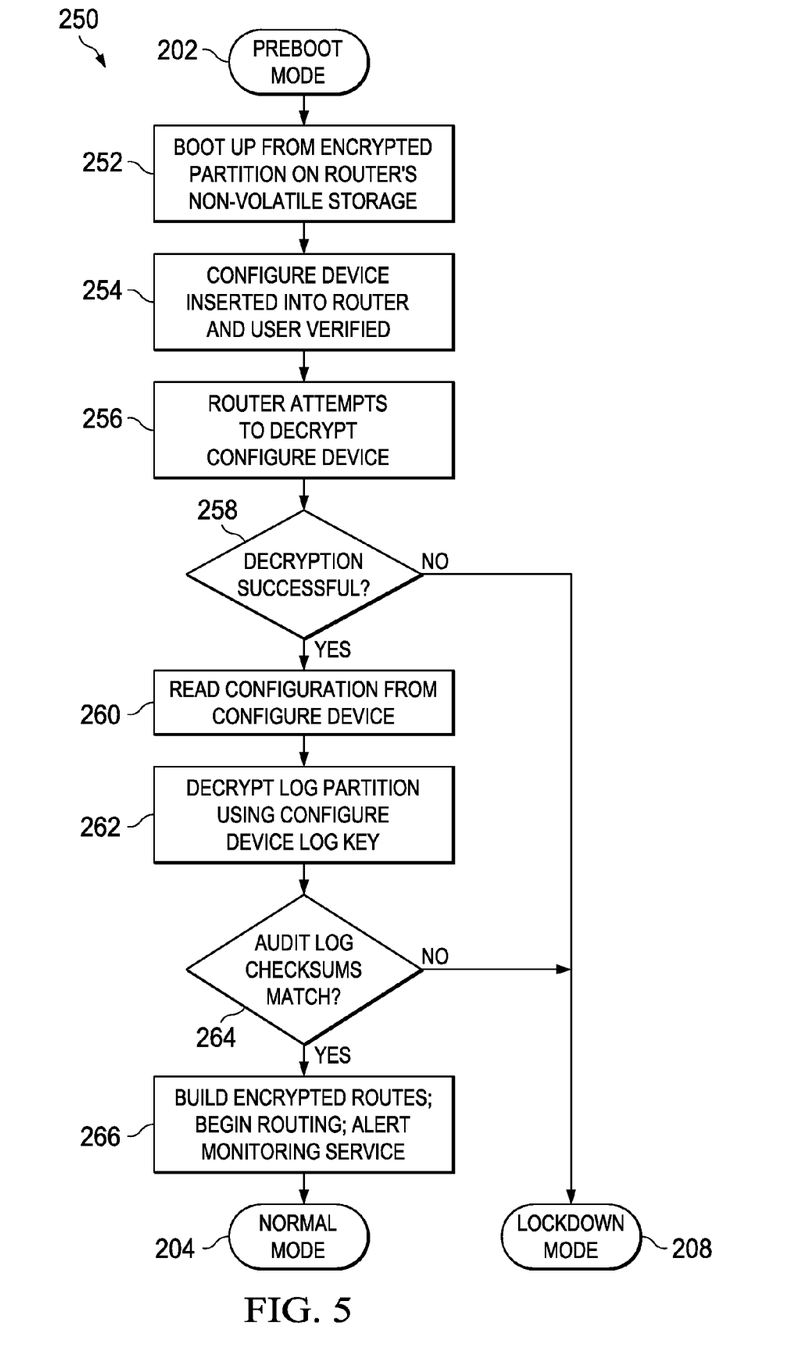
FIG. 5 shows an illustrative method of booting up a router in accordance with an embodiment of the invention.

Details of an illustrative router boot process 250 are shown in FIG. 5, including the transition to lockdown mode upon tampering detection. At 202, the router is in a preboot mode 202 (e.g., an off state). Upon, for example, a user activating a reboot control 169 on the router, the router begins executing boot code, which may be part of the code 163 or BIOS 173. At 252, the router boots up from an encrypted partition on the router's non-volatile storage 156 decrypted using embedded key 158. Then, at 254, the process 250, the user inserts (perhaps at the request of a prompt on the display 168) the configuration device 160 in the USB port 144. The user of the configuration device may be verified in a suitable process such as through biometric verification. The process then continues by decrypting the information contained on the configuration device 160 (256). This router's CPU 142 uses the embedded key 158 to attempt the decryption of action 256.

If this decryption fails (as determined at 258), the key does not match the router or has been improperly altered. In such a situation, the router enters lock down mode 208. If, however, the decryption succeeds at 258, the router's CPU 142 reads, from the configuration device, the router identity 151 for each accessible router as well as the corresponding secret key 153 and tunnel information 149. The router then, at 264, computes and compares checksums of the configuration device's audit log 157 to the audit log 161 stored on the router's non-volatile storage. If the two logs do not match, then the router is transitioned to the lockdown mode 208. If, however, the checksums of the logs match, then at 266, the router builds encrypted routes (e.g., tunnels), begins routing packets, and alerts the monitoring server 132 that the router has been booted up successfully. At that point, the router is now in the normal mode 204 of operation. The router also provides a checksum of its own audit log 161 to the monitoring server 132. The monitoring server 132 computes a checksum of its own copy of that router's audit log 209 for cross-verification. If the checksums match, then the router is permitted to continue operating in its normal operating mode. If the checksums do not match at the monitoring server, the monitoring server raises an alert and, if desired, causes the associated router to transition to a lockdown mode. Entry into the normal mode 204 also requires removal of the configuration device 160 in accordance with at least some embodiments. This security feature prevents tampering with the configuration device 160 during normal operation.

As explained above, a router attempts to decrypt the encrypted information contained on the configuration device 160 coupled to that router during the boot process. The information was previously encrypted using the embedded key 158 and thus can be correctly decrypted with, and only with, the same embedded key. If the configuration device 160 is coupled to a router that did not provide the embedded key used to encrypt the configuration device's information in the first place, then the decryption process during boot up of the router will not be successful, and the router enters the lockdown mode as explained above.

Changes to the router's configuration are made in a "maintenance" mode. The maintenance mode preferably cannot be entered without a legitimate configuration device 160 and maintenance device 162 coupled to the router. The maintenance device 162 contains a key that has been encrypted using the router's embedded key 158. Upon coupling the maintenance key 162 to the router's USB port 146, the router's CPU 142 authenticates the user of the maintenance device (e.g., via biometrics as explained above) and also decrypts the encrypted key on the maintenance key using the router's embedded key 158. Any attempt to insert a compromised maintenance device 162 will fail upon decryption and cause the router to enter the lockdown mode.

Figure 6:
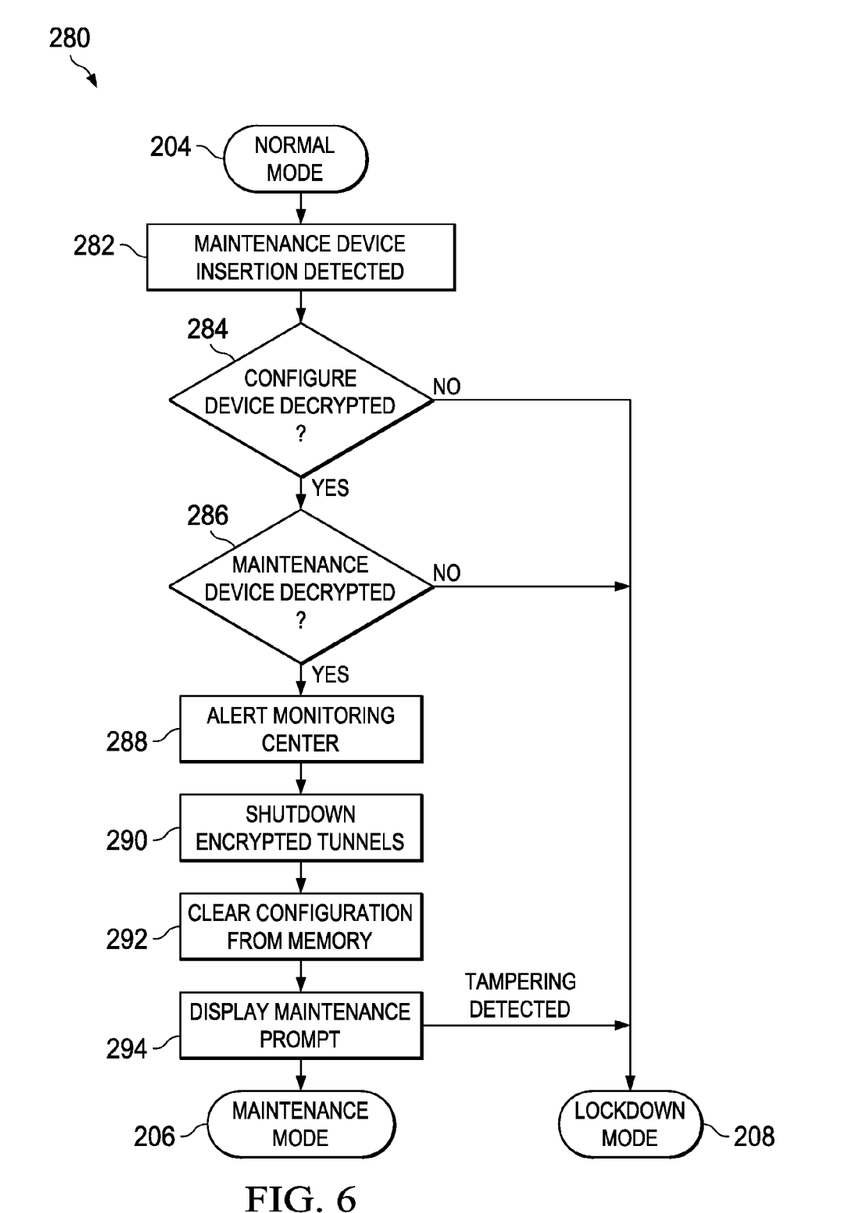
FIG. 6 shows an illustrative method of transitioning a router from a normal mode to a maintenance mode in accordance with an embodiment of the invention.

FIG. 6 illustrates an exemplary process 280 for transitioning from the normal mode to the maintenance mode. In preferred embodiments, all configuration information is present on the configuration device 160, not in permanent storage on the router's non-volatile storage 156. Thus, in such embodiments to perform maintenance on the router, both devices 160 and 162 must be coupled to the router and the users' validated (e.g., biometric verification). At 204, the router is in the normal mode. A user authorized to perform maintenance on the router inserts his or her maintenance device 162 into a USB port on the router. The insertion of the maintenance device 162 is detected at 282. At 284, the data contents of the configuration device 160 are decrypted (i.e., validated). This action is performed by the router's CPU 142 which attempts to decrypt the contents of the configuration device 160 using the embedded key 158. If the configuration device 160 is not successfully decrypted, the router enters the lockdown mode 208. At 286, the maintenance device 162 also is similarly decrypted (validated). If the maintenance device 162 is not successfully decrypted, the router enters the lockdown mode 208

If both of the configuration and maintenance device 160 and 162 are successfully decrypted, which requires both users of the two devices to physically be present at the router, control passes to 288 a message is sent from the router to the monitoring server 132 to alert the monitoring server that the router is being transitioned to a maintenance mode. At 290, the communication tunnels of the router being maintained are shutdown thereby precluding further communications to/from that router. At 292, the router's volatile memory 154, or at least any configuration data in such memory, is erased thereby reducing the potential for such information from falling into the hands of a thief. At 294, information such as menu options pertaining to the maintenance mode are shown on the display 168. At 206, the router is now in the maintenance mode. Any one or more of a variety of maintenance actions can now be performed on the router. Any attempt to tamper with the router will result in the router being transitioned to the lockdown mode 208.

For example, in accordance with a preferred embodiment of the invention, a router cannot be added to the network without reconfiguring the configuration devices 160 of all other routers to which the newly added router is to communicate. Such changes include adding the identity of the newly added router as well as the added router's public key and tunnel information regarding how packets are to be communicated between routers.

Upon insertion of a configuration device 160 and maintenance device 162 into the router, the users of each such device are verified (e.g., by biometric verification as explained above). As seen above, the router cannot be booted up, in accordance with at least some embodiments, without the presence of the correct configuration device. Further, even theft of the router and its corresponding configuration device 160 renders the router useless to the thief without the physical presence of the person that is authorized to use the configuration device 160.

Further, attempted theft of information by redirecting network traffic is not possible without reconfiguring a router to redirect its outgoing packets to a compromised destination. Changing the configuration of the router requires the presence of the configuration device 160 and the maintenance device 162. Accordingly, because the configuration and maintenance devices 160 and 162 are useless without verifying (e.g., via biometrics) the persons authorized to use those particular devices, improperly attempting to change the router's configuration would require collusion of the configuration and maintenance persons. Even in case of collusion between both of the configuration and maintenance personnel, any attempt to change the configuration to divert routed packets to an unauthorized third party would be detected by the monitoring server 132 and thus annunciated at the monitoring center 130. In addition, in at least some embodiments only network traffic meant for that location can be diverted.

Physical access to each router is required to alter traffic patterns (i.e., no core router exists in the system nor a centralized configuration), further described below. The operation of the monitoring center is described below in further detail.

Malicious modification of the network by changing secret keys cannot be accomplished by compromising only one router. Instead, altering the secret key(s) and router identity(ies) (FIG. 3a) on a single router's configuration device 160 requires, in at least some embodiments, changing the configuration key of all routers in the network, or at least those routers that are to send packets to, or receive packets from, the router whose configuration device 160 is being altered. Any attempt to unilaterally change a configuration device's secret key(s) is useless because packet encryption/decryption will fail without exact corresponding shared secret keys at all routers on the network that have a tunnel to the router that has changed.

A property of the preferred embodiment of the network is that at least some events are logged and alerts are generated at the monitoring center 130 as appropriate. All routers are continuously polled ("pull") for status by the monitoring server 132, and any break in regular status health checks cause alerts to be annunciated to the responsible personnel. Further, routers also send ("push") regular and exceptional events. This dual push and pull status arrangement increases reliability. Even though some events may be legitimate, such as a router going down for a planned maintenance activity, the alert mechanism insures that monitoring center personnel are generally always informed. Thus, any behavior on the network of an unexpected or unauthorized nature is promptly reported and acted upon. The monitoring center preferably contains escalation procedures and contact information (e.g., phone numbers) for responding to alerts.

Computer systems are prone to tampering by unauthorized personnel, and several aspects of the invention specifically address preventing tampering and alerting appropriate parties when tampering has occurred. The methods described herein insure the router itself is in an uncompromised state, and alert personnel when a router has been compromised.

There is a risk that physical access to the router will be obtained by unauthorized personnel, and so mechanisms are implemented to reduce the likelihood of hardware attacks. The router itself has no or few user-accessible features. Some embodiments of the routers include no keyboard interface, no mouse port, no serial or parallel ports, no CD-ROM drive, no wireless capability, etc. In such embodiments, the only externally accessible user-activated components are such components as a power button, a power cable, status display 168, and input controls 169 (usable generally only to navigate menus on the status display), and biometric validation or password input device 174

Password-protection is enabled on the router's BIOS during manufacture and at least some embodiments of the router do not include a floppy disk or Flash memory reader. The BIOS is configured so that devices connected to the USB ports 144 and 146 cannot be used to boot the router. Thus, the router generally cannot be booted from any device other than the manufacturer-installed non-volatile storage 156. Each router also includes sensors 175 and security logic 177 that causes the monitoring server 132 to be alerted upon attempts to physically breach the router's enclosure. Any attempted security breach causes the security logic 177 to interrupt the router's CPU 142 which then transitions the router to the lockdown mode 208. Physical seals are also present on the seams of the enclosure to allow a visual inspection of the router for signs of tampering.

Attacks are not always physical, but could be made by maintenance personnel while attending to the router. Thus, in accordance with at least some embodiments of the invention, configuration route information and the packet session keys usable for routing are not written to the router's non-volatile storage. Instead, the session keys are generated on the fly during initialization and re-established thereafter as explained previously. As explained above, prior to entry into the maintenance mode, all configuration information and encryption keys are erased from the router's volatile memory 154, reducing the possibility of theft of such information. Furthermore, the session keys preferably are written to non-volatile storage 156 on the router.

External attacks on the router via the network connections are also addressed in the preferred embodiments of the invention. For example, all programs and features of the router's operating system (not specifically shown) are removed from the system except those explicitly required for that particular router to adequately operate. Non-enabled or unused operating system services are a common source of attacks on network devices, and the router of the preferred embodiment has installed only those services actually in use. Thus, only a dedicated, minimalist, pared-down, customized router operating system is installed on the router, leaving the router immune from many common attacks on popular software. In addition, in at least some embodiments, for added security remote logins are not allowed to the router.

Even if a router is physically compromised, for instance via theft, the router has one or more defense mechanisms. Since only volatile storage (not non-volatile storage) in the router contains router session keys, an attempt to steal the router causes all session keys to be cleared from the router (e.g., once power is removed during a theft). Also, theft of a configuration device 160 or maintenance device 162 is useless since these keys are only readable with decryption using the router's embedded key 158.

The monitoring center 130 polls some or all routers on the network for a variety of information usable for successful authorization. Such information falls into two categories: audit information and performance information. The monitoring center comprises one or more monitoring servers 132 which execute software that implements some or all of the functionality attributed to the monitoring server 132 or monitoring center 130 in this disclosure.

Audit information for each router can be used to assist in implementing the triple-control design. Basic up/down status of each router is reported to the monitoring server 132 to determine if the router has been taken offline or placed back online. Taking a router offline may be due to any number of reasons (some of which are legitimate and others may be indicative of a security problem). Examples of legitimate reasons for taking a router offline include lower-level network failures and hardware failures. Taking a router off-line and placing it back on-line generally follows each change in the router's configuration. That is, a router must be rebooted, in at least some embodiments, for a configuration change to take effect. Thus, change in the on-line/off-line status of a router may be indicative of a change in that router's configuration, which could be for legitimate or illegitimate reasons. A change in the up/down status of a router will alert monitoring center personnel so that the reason for router's disconnection can be quickly determined. This audit measure helps to insure that unauthorized users who take a router offline for purposes of tampering or theft will be detected. Even if two parties in control of the router, such as a user of the configuration device 160 and a user of the maintenance device 162, collude to engage in malfeasance of the router or network, such unauthorized activity will be detected by the monitoring server 132 as an interruption of normal operation.

Other audit information is also collected to prevent more sophisticated attacks. Upon the occurrence of changes to a router's operation, such as configuration changes made during a maintenance mode, a checksum of the router's audit log 161, prior to the log being updated with the new audit information, is transmitted by the router to the monitoring server 132. The monitoring server 132 compares the received checksum to a checksum of its own mirrored copy 209 of that router's audit log (which should be identical). If the checksums do not match, an alert is generated in the monitoring center 130. If the checksums match, the monitoring server's audit log 209 is updated to match the update made to the router's internal audit log 161, which will also be reflected in the audit log 157 of router's configuration device 160.

Encryption tunnel active count 214 is also monitored by the monitoring server 132 so that any attempt to manipulate or move encryption tunnels by bringing them up and down with counterfeit routers will cause an alert to be generated at the monitoring center 130. By way of example, assume that the network, monitored by the monitoring center, has 10 routers. Each router should then have 10 tunnels when fully operational. The monitoring center knows this is the correct number since the monitoring center knows the network to which the router belongs (by IP address). The routers periodically send a status update to the monitoring system of the number of encrypted tunnels that they each have active. If a counterfeit router were inserted into the system, the number of active tunnel routes would now be 11 at the compromised router. Even if one were to shut down one tunnel at the compromised router, thereby keeping the number at active tunnels at 10, the other router on the other end of the shutdown tunnel would reduce its active tunnel count to 9. Either way, the monitoring center will find out.

Performance information measured or otherwise determined by each router, usable to indicate a reliable network, is also collected periodically by the monitoring server 132 and stored in the performance log 213. Some performance data may by "pushed" to the monitoring center (e.g., via SNMP traps). Other performance data may be "pulled" from the routers by the monitoring center (e.g., via "ping" or "SNMP get"). Monitoring such performance information allows for proactive action on performance problems that, if untreated, may manifest themselves later as false-positives of router tampering. For instance, if a network has such degraded performance that status inquiries routinely fail to reach their destination, such inquiry failures may incorrectly suggest that the router may be being brought offline for tampering.

Collected performance data includes various data such as minimum, average, and maximum packet latency to other routers on the network. Such latency information is useful to identify slow responding links. Different or additional performance data can also be collected. Data throughput is measured to indicate a bandwidth saturation issue that could lead to degraded performance. Packet loss indicators measure the rate at which, or number of, packets that are dropped network packets. A high packet drop rate could cause a false tamper warning to be generated.

In addition to monitoring functions, the monitoring center 130 itself has control provisions. The audit log 209 stored at the monitoring center 130 is encrypted and written to a non-erasable persistent storage device database 206. This device is periodically archived offsite in a secure location and replaced with a new device. Furthermore, the monitoring center's copy of the distributed log is not readable or writeable without authentication of a particular monitoring key, which is controlled and authorized only to trusted monitoring center personnel.

The monitoring server 132 also implements alerting system. The alerting system informs monitoring center personnel through monitoring console 134 of activity on the network 102 so that investigative and corrective action can be taken promptly. The alerting system helps to detect subversive actions pertaining to users of the routers. Various alerts are triggered by events reported to the monitoring server 132 by the routers. The absence of expected events, such as regular polling or scheduled maintenance, also raises alerts. For example, information regarding upcoming the scheduling for planned maintenance activities can be provided to the monitoring server 132 and any deviation from the maintenance schedule, be it the failure to perform a planned maintenance on a router or performing a maintenance that was not planned, can be detected by the monitoring server. The monitoring console 134 may also send alerts to pagers, cell phones or other remote alert devices.

An alert is raised when a router enters its normal mode 204. This happens when all keys have been verified, when log checksums are validated, and encryption tunnels established as explained above. The normal mode 204 should only be entered upon reboot, so alerts are warranted. Frequent reboots could be a sign of attempted tampering.

An alert is raised whenever a physical device, be it the configuration device 160, maintenance device 162, or another device, is inserted into, or removed from, a router. Frequent or unscheduled device insertion activity could be a sign of attempted key forgery.

An alert also is raised whenever the maintenance mode 206 is entered. This will only happen when both the configuration and maintenance devices 160, 162 have been inserted and their users have been verified, in preparation for, for example, a configuration change or problem diagnosis. Unplanned maintenance mode entry or entry of maintenance mode without a stated reason could be a sign of collusion to attempt to divert routed data to unauthorized sources.

An alert is raised whenever a configuration change is made to the router while in maintenance mode 206. A change is detectable when the configuration checksum of the configuration device 160 audit log 157 is different from that of the checksum of the router's own audit log 161 or the monitoring center audit log 209. This change can only be made in the maintenance mode or will be automatically rejected, causing the router to be transitioned to the lockdown mode. By generating alerts upon the occurrence of a configuration change, any unplanned or unauthorized routing changes can be immediately reported and acted upon.

An alert also is raised whenever a router enters the lockdown mode. Sometimes, if lockdown mode has been entered and there are currently no encryption tunnels active, lockdown mode will be entered to the router audit log 161 only. Then, when the router comes back online in its normal mode 204, an alert will be raised because the checksum of the log 161 on the router will be different from the checksum of the log 209 at the monitoring center. The log can then be analyzed to determine if the lockdown mode record is cause for concern.

In at least some embodiments, session keys are not stored at or accessible by the monitoring center 130. This means that at no time can the monitoring center 130 see any data traffic passing on WAN 120 or LAN 112, 114, etc.

The alerts generated by the monitoring server may be in the form of a pop-up window on the alert station 134, an email, a text message, or any type of visual or audible indication to a person. Based on the alert, the person will take appropriate action. Examples of such appropriate action could be to alert appropriate personnel at the office in which the problematic router is located, to send a message to the router to cause the router to transition to the lockdown mode, or any other suitable action.

The above discussion is meant to be illustrative of the principles and various embodiments of the present invention. Numerous variations and modifications will become apparent to those skilled in the art once the above disclosure is fully appreciated It is intended that the following claims be interpreted to embrace all such variations and modifications.

What is claimed is:

1. A router, comprising:
a plurality of ports;
control logic coupled to said plurality of ports, wherein said control logic implements a security protocol dictated, at least in part, by contents of at least two separate external storage devices, each storage device separate from the router, but coupled to one of the ports of said router;
wherein said router contains a first audit log and at least one of said external storage devices contains a second audit log and said router cannot complete a boot process unless said first and second audit logs match.

2. The router of claim 1, wherein at least one of said external storage devices contains identifies of other routers and, for each router, routing information pertaining to how packets are to be transmitted between routers.

3. The router of claim 1 wherein said contents are encrypted using an embedded key stored only in non-volatile storage of said router.

4. The router of claim 1 wherein the contents of the external storage devices of said router differ from contents of any other external storage device coupled to other routers.

5. The router of claim 1 wherein said security protocol comprises precluding access to a maintenance mode to change a configuration of the router unless the control logic has verified at least two authorized persons.

6. The router of claim 1 wherein at least one of the external storage devices comprises a maintenance device that contains a password of a person authorized to perform maintenance on the router.

7. The router of claim 6 wherein said control logic transitions the router to a maintenance mode upon coupling a valid external storage device and a valid maintenance device to said router.

8. The router of claim 1 further comprising a biometric validation device by which a user of at least one of the external storage devices validates himself or herself to said router.

9. The router of claim 1 further comprising non-volatile storage on which an audit log is stored, said audit log comprising a history of previous reboots of said router.

10. The router of claim 1 wherein said control logic computes a checksum of said first and second audit logs to determine if said audit logs match.

11. The router of claim 1 wherein a third audit log is stored on a remote computer and said router provides updates to said second and third audit logs so that said first, second and third audit logs match.

12. The router of claim 11 wherein said router receives an instruction to transition to a lockdown mode if said first audit log does not match said third audit log.

13. A router, comprising:
a plurality of ports;
control logic coupled to said plurality of ports, wherein said control logic precludes a configuration of said router to be changed without authenticating at least two persons via biometrics;
wherein one person uses a configuration device and another person uses a maintenance device and the user of each such device authenticates him or herself to the router by way of a separate password or biometric.

14. The router of claim 13 wherein said router further comprises non-volatile storage and contents of said configuration and maintenance devices are encrypted using an embedded key stored in said non-volatile storage.

15. The router of claim 13 wherein a configuration device couples to a port externally exposed on said router, and said control logic precludes said router from initializing to a normal mode unless a decryption of the contents of said configuration device is successful.

16. The router of claim 15 wherein said decryption uses an embedded key stored in said router.

17. The router of claim 13 wherein at least two separate devices couple to at least two separate ports externally exposed on said router to perform maintenance on said router, and control logic precludes said router from transitioning to a maintenance mode unless decryption of the contents of said configuration and maintenance devices is successful.

18. A system, comprising:
a monitoring system; and
a plurality of routers coupled to, and monitored by, said monitoring system;
wherein each of said routers implements a security protocol dictated, at least in part, by contents of at least two external storage devices separate from the router, but coupled to ports of said router; and
wherein each router operates in accordance with a configuration that cannot be changed unless two external storage devices are coupled to said router by two different people and the router authenticates each person.

19. The system of claim 18 wherein each router operates in accordance with a configuration stored on at least one of the external storage devices, said configuration for each router not being stored in non-volatile storage in said router.

20. The system of claim 18 wherein one external device stores said configuration and the other device stores a password usable to change said configuration.

21. The system of claim 18 wherein each router contains an audit log that is mirrored in said monitoring system.

22. The system of claim 21 wherein said monitoring system determines whether said audit logs match.

23. The system of claim 21 wherein said monitoring system raises an alert if said audit logs do not match.

24. The system of claim 18 wherein an audit log associated with each router is stored in at least three places including on said router, on a device external to, but coupled to, said router, and on said monitoring system.

25. A method, comprising:
connecting a first storage device to a router, said first storage usable by a first person;
connecting a second storage device to said router, said second storage usable by a second person;
via biometrics, authenticating each of the first and second persons;
performing a maintenance activity on said router only if both of said first and second persons are successfully authenticated.

26. The method of claim 25 further comprising encrypting contents of at least one of the first and second storage devices using an embedded key stored only in non-volatile storage of said router.

27. The method of claim 25 further comprising precluding all maintenance activities of said router from being performed unless both of said first and second persons are successfully authenticated.

28. The method of claim 25 further comprising transitioning the router to a lockdown mode if either of the persons are not successfully authenticated, wherein while in said lock down mode, the router is unable to receive and process packets.

29. The method of claim 25 further comprising storing an audit log in at least three places including on said router, on at least one of the first and second devices, and on a remote monitoring system.

30. The method of claim 29 further comprising precluding the router from completing a boot process unless said at least two of said audit logs match.

* * * * *